(12) United States Patent
Chopra

(10) Patent No.: US 11,905,918 B2
(45) Date of Patent: Feb. 20, 2024

(54) HYDROKINETIC ENERGY BASED POWER GENERATION SYSTEM

(71) Applicant: Truedo Technologies Pvt. Ltd., New Delhi (IN)

(72) Inventor: Kshitij Chopra, New Delhi (IN)

(73) Assignee: Truedo Technologies Pvt. Ltd., Dwarka (IN)

( * ) Notice: Subject to any disclaimer, the term of this patent is extended or adjusted under 35 U.S.C. 154(b) by 0 days.

(21) Appl. No.: 17/568,383

(22) Filed: Jan. 4, 2022

(65) Prior Publication Data

US 2022/0213863 A1  Jul. 7, 2022

(30) Foreign Application Priority Data

Jan. 7, 2021 (IN) .............................. 202111000787

(51) Int. Cl.
*F03B 13/16* (2006.01)
*H02K 7/18* (2006.01)

(52) U.S. Cl.
CPC ........... *F03B 13/16* (2013.01); *H02K 7/1892* (2013.01)

(58) Field of Classification Search
None
See application file for complete search history.

(56) References Cited

U.S. PATENT DOCUMENTS

| | | | |
|---|---|---|---|
| 8,022,563 B2 | 9/2011 | Lemieux | |
| 2004/0251750 A1* | 12/2004 | Cheung | H02K 35/02 310/23 |
| 2014/0117673 A1* | 5/2014 | Phillips | H02K 35/00 290/53 |

FOREIGN PATENT DOCUMENTS

| | | |
|---|---|---|
| JP | 2002320369 A | 10/2002 |
| JP | 2011114884 A | 6/2011 |

\* cited by examiner

*Primary Examiner* — Tulsidas C Patel
*Assistant Examiner* — S. Mikailoff
(74) *Attorney, Agent, or Firm* — Lambert Shortell & Connaughton; David J. Connaughton, Jr.; Justin P. Tinger

(57) ABSTRACT

A hydrokinetic energy based power generation system is described, including several modules filled with fluid or vacuum and anchored to a stream bed of water body, multiple basic units associated with each module for converting hydrokinetic energy into electrical energy, wherein each basic unit includes two springs affixed with a top and bottom portion of the modules in such a way that the hydrokinetic energy induces vibrations within the springs, a cylindrical tube positioned between the springs, and contained with a ferromagnetic fluid, two fixed magnets and a movable magnet, wherein the movable magnet oscillates in between the fixed magnets due to the induced disturbances caused by waves/ocean and repulsive forces caused by the fixed magnets, an electric coil associated with the tube, for generating electric current by harnessing the relative motion of the movable magnet and electric coil due to electromagnetism phenomenon and in accordance with laws of electromagnetic induction.

5 Claims, 4 Drawing Sheets

HYDROKINETIC ENERGY BASED POWER GENERATION SYSTEM

FIELD

The aspects of the disclosed embodiments relate to wave energy harvesting systems and devices. More specifically, the aspects of the disclosed embodiments relate to a system for harnessing and converting hydrokinetic energy generated due to sinusoidal movement or waves of water bodies (i.e., oceans, rivers, sea etc.) into electrical energy.

BACKGROUND

Water body is developed due to the significant accumulation of water (usually saltwater). The water body can be described by different terms such as oceans, seas, lakes, ponds, puddles etc. Any water body may be subjected to significant disturbances due to wind and gravitational pull caused by celestial objects such as the Sun and the Moon, which may in turn cause a periodic sinusoidal motion, resulting in the generation of waves, tides, ocean currents etc. in the said water body. It may also be affected by other phenomenon (i.e., due to Earthquakes, eruptions, landslides, and other disturbances above or below the water body surfaces) that further cause displacement and wave formation on the surfaces.

Hydrokinetic energy is a form of energy that is generated due to the formation of sinusoidal motion in a water body i.e., waves, tides etc. due to gravitational pull of celestial bodies as well as wind generated due to uneven heating and cooling effects of the Sun on Earth's surface. The hydrokinetic energy is a type of renewable source of energy which is capable of being converted and used in the form of electrical energy. In order to reduce reliance on traditional sources of energy (i.e., coal, natural gas, oil), which have been one of the largest sources of global carbon emissions and contributor to climate change, a consequential effort has gone into development as well as deployment of technologies focused on harnessing and utilizing the renewable sources of energy (i.e., solar, wind, hydro energy, etc.) so as to cope with the future energy demand and ensure sustainable development.

A major share of current renewable energy generation is derived from solar and wind resources. Although, solar and wind generation technologies alleviate a significant amount of carbon emissions in energy generation, they are limited by—high capital costs, immense need for land resource, and most importantly intermittency in energy generation. Also, it is pertinent to note, that these technologies pose a major risk of e-waste which in some cases have carcinogenic runoffs when put in landfills at the end of their useful life of 25 years. As a consequence of these shortfalls, new technologies that bridge their gaps are needed. Hydrokinetic energy has the potential to circumvent the shortcomings of present renewable generation technologies. Different types of devices are presently in use for harnessing the ocean energy such as tidal, wave/hydrokinetic energy, but these devices are limited in their yield, scalability, and their ability to generate power continuously.

Talking about constructional drawbacks of these devices, some of the devices harnessing marine/ocean energy are constructed and installed so inside the water body, up to a defined sea level. The installation of these complex devices is a very tedious and time-consuming task due to which their commercial viability has been very limited. Moreover, as the devices are installed within the water body, the components housed in the devices are subjected to high levels of atmospheric pressures due to which the components require routine maintenance that adds to huge operational costs. Also, these devices have low yield and pose high risk of interference with the maritime environment.

U.S. Pat. No. 8,022,563B2 discloses a wave energy generator that includes a float on the surface of the body of water. It describes an electrical energy generator that includes a housing, a reciprocally movable electromagnetically active mass, a coil of electrically conductive material, and springs for connecting the mass to the housing. It also describes another set of springs that will adjust non-linear motion of the electromagnetic active mass.

JP2002320369A discloses a power converter having two magnetic rods perpendicularly affixed with each other in such a manner that the rods are capable of reciprocating in a oscillatory motion with the help of springs. The magnets are coiled with windings, in such a manner that electric current is generated in the windings due to the relative motion of the magnets. In simple words, vibration energy of magnets is converted into electric energy by the phenomenon of electromagnetic induction.

JP2011114884A discloses a generation device having a two spring based mechanism named as vibration amplifying mechanism and an arrangement of magnet and coil named as generating means. The device is employed with a vibrator that induces vibrations in the system that is amplified by the spring based mechanisms. The amplified vibrations are transferred to the generating means for converting the vibration energy into electrical energy. The magnet of generating means, upon receiving the amplified vibrations reciprocates relative to the coil, resulting in generation of electric current by the phenomenon of electromagnetic induction.

The foregoing cited documents resemble the aspects of the disclosed embodiments in the sole purpose of converting vibration energy into electric energy. However, the cited documents are limited to generation of small amounts of electrical energy as the converters only have a spring-based mechanism for inducing the vibration which would be prone to substantial dampening. Moreover, in all the above there is only a single unit deployed which is not capable of generating electricity for utility scale applications.

On the other hand, the aspects of the disclosed embodiments have a set of two fixed and one movable magnets along with the springs, and the magnets are arranged in such a way that the fixed magnets aid in creating a repulsion force which in turn is superimposed with the vibration of springs resulting in increased reciprocation speed of the movable magnet, thus generating substantial amount of electrical energy. The aspects of the disclosed embodiments also use ferro-fluids in order to reduce the damping effect due to the sliding friction between the moving magnet and the tube containing it. Along with this, the aspects of the disclosed embodiments have a set of modules/encasements in which multiple of such units are placed and cascaded in order to generate higher power output.

The cited inventions also work on the concept of electromagnetic induction for harnessing the vibration energy and converting it into electrical energy. However, they rely on the spring systems to produce oscillatory motion in the active electromagnetic mass directly which reduces efficiency drastically as the springs connected to the active mass are prone to dampening and the active mass (which also acts as a load) experiences a sliding friction with encasement, the aspects of the disclosed embodiments however mitigate this situation by allowing a magnet to float in the magnetic field of two other fixed magnets. Also, the aspects of the disclosed embodiments allow ferrofluids in the tube to drastically reduce the sliding friction between the tube and the movable magnet by forming O-rings on the edges of the magnets. Also, the cited inventions a more concerned about miniaturizing the device rather than generating higher power output, due to which, the device cited in the foregoing documents also lacks the ability of generating power that could be of consequence for utility scale applications. In addition to this, the cited documents do not involve the use of ferromagnetic fluid and fixed magnets, making the devices less efficient and with lower power output when compared to the aspects of the disclosed embodiments.

Contrastively, the aspects of the disclosed embodiment not only employ with fixed magnets but is also contained with ferromagnetic fluid that aids in enhanced reciprocation of the magnets and almost eliminating the sliding friction between the moving magnet and the adjacent tube housing it. Apart from this, the aspects of the disclosed embodiments have multiple energy generation units in a cascaded form for generating a huge amount of electricity with minimal losses. Thus, the aspects of the disclosed embodiments prove to be more efficient in terms of power output.

Conclusively, in order to fulfill the current as well as future requirements of clean electric energy, there exists a need to provide an effective alternative that builds upon the shortcomings of current renewable energy sources (wind, solar etc.) and efficiently harnesses hydrokinetic energy to produce electric energy by simply floating on the surface of the water body (i.e., oceans, rivers, sea etc.).

SUMMARY

A principal aspect of the disclosed embodiments is to overcome the disadvantages of need for substantial land resource and intermittency in power generation, in other words capital costs and reliability in current renewable generation technologies i.e., Solar and Wind energy.

The aspects of the disclosed embodiment provide a system that harnesses and coverts maximum amount of hydrokinetic energy into useful form of energy (i.e., electrical energy).

Another aspect of the disclosed embodiments is to provide a system that performs its function on the upper surface of the water body, thus eliminating the need for under water installation which are commercially inhibitive and cause interference to the maritime environment.

Another aspect of the disclosed embodiments is to provide a system that is light weight and easy to manufacture.

The foregoing and other objects, features, and advantages of the aspects of the disclosed embodiments will become readily apparent upon further review of the following detailed description of the preferred embodiment as illustrated in the accompanying drawings.

BRIEF DESCRIPTION

The aspects of the disclosed embodiments relates to a system that is deployed to float on upper surface of a water body (i.e., ocean, river, sea etc.), for capturing and converting the energy generated due to sinusoidal/free movement of water body into stabilized electrical energy.

According to a first embodiment of the present disclosure, a hydrokinetic energy based power generation system, comprising multiple encasements or 'modules', each crafted with a cavity to house plurality of 'basic units' that convert the hydrokinetic wave motion into electrical energy, one or more anchors interconnected between the encasements or 'modules' and streambed of a water body in order to hold the 'modules' at a particular position, multiple 'basic units' cascaded and housed inside the encasements or 'modules' for converting hydrokinetic energy of the water body into electrical energy.

According to a second embodiment of the present disclosure, each of the 'basic units' defined in the first embodiment of the present disclosure, comprises of at least two springs affixed at top and bottom portions of the 'module' in such a manner that the hydrokinetic energy of water induces vibrations/jerks in the springs, a cylindrical shaped tube installed in between both the springs, and containing ferromagnetic fluid which forms toroidal 'O-rings' on the edges of the magnets within the tube, two fixed magnets and a movable magnet, wherein the movable magnet oscillates in between the fixed magnets due to the induced vibrations as well as repulsive force caused by the fixed magnets, an electric coil positioned on the cylindrical tube. Wherein the coil works on electromagnetic phenomenon in conjunction with the movable magnet in producing electromotive force based on the principles of electromagnetic induction. The device therefore harnesses hydrokinetic energy that causes relative motion of the magnet and electric coil (placed over the tube) for generating electric current.

According to yet another embodiment of the present disclosure, the electric coil of each 'basic unit' is electrically connected to a voltage processing unit for converting the generated AC (alternating current) into DC (direct current) and limiting the rate at which the converted direct current is supplied further, at least one rechargeable battery or a capacitor or another form of energy storage device is connected to the voltage processing unit for storing the direct current supplied by the 'basic unit' to the voltage processing unit.

While the invention has been described and shown with particular reference to the preferred embodiment, it will be apparent that variations might be possible that would fall within the scope of the aspects of the disclosed embodiments.

BRIEF DESCRIPTION OF THE DRAWINGS

These and other features, aspects, and advantages of the aspects of the disclosed embodiments will become better understood with regards to the following description, appended claims, and accompanying drawings where:

DETAILED DESCRIPTION

The following description includes the preferred best mode of one embodiment of the aspects of the disclosed embodiments. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," "consists essentially of," and the like or the respective closed phrases "consisting of," "consists of," the like.

As used herein, the singular forms "a," "an," and "the" designate both the singular and the plural, unless expressly stated to designate the singular only.

As used herein the term "buoyancy" refers to a force exerted on an object that is wholly or partly immersed in a fluid.

As used herein the terms "modules" and "encasements" are used interchangeably with each other while explaining the aspects of the disclosed embodiments.

The aspects of the disclosed embodiments relate to a wave energy-based power generation system, for converting the hydrokinetic energy into useful electrical energy. The system is deployed on the upper surface of a water body, wherein the system comprising multiple 'modules' cascaded together, floats over the water body (i.e., oceans, rivers, sea etc.) in order to capture and convert the sinusoidal movement of water into useful electrical energy.

The system is so developed that it is capable of producing a large power output that can be used for operating big and vital electric units/appliances and may be deployed for utility scale power generation applications. The system works on the phenomenon of electromagnetic induction for generating utility scale electrical energy, wherein multiple 'modules' are cascaded together, while each module itself comprises of multiple 'Basic Units' cascaded together. The system harnesses the magnetic flux of powerful rare-earth magnets or magnets of comparable magnetic intensity for converting and harnessing the reciprocation motion of waves or hydrokinetic energy into electrical energy.

Figure 1:
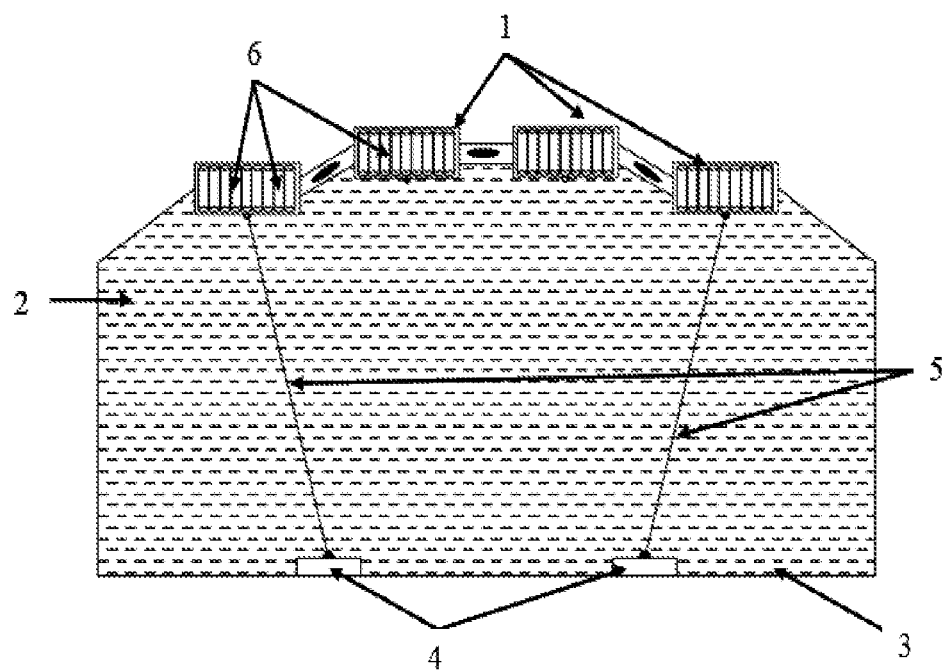
FIG. 1 illustrates a front view of the encasements or 'modules' anchored with the stream bed of a water body (i.e., oceans, rivers, sea etc.)

Referring to FIG. 1, a front view of the hydrokinetic energy-based power generation system is illustrated, wherein the system comprises of multiple cuboidal shaped encasements or 'modules' 1 that have cavities. The encasements/modules 1 are filled with defined amount of air or vacuum or any other fluid with comparable density in order to increase the volume, thereby increasing the buoyancy force. The encasements/modules 1 are deployed in a water body 2 and are moored with the stream bed 3 of the water body 2 by means of anchor(s) 4 and cables. One or more anchors 4 and cables 5 are used depending on the number of 'modules' 1 that are to be deployed on the surface of the water body 2.

As the encasements or 'modules' 1 are filled with air or have vacuum or any other fluid of comparable density, the fluid consequently experiences a buoyant force as per the Archimedes principle that keeps it afloat the water body. Elucidating the same, the formula for calculating buoyant force is $F_B = -V\rho g$, where $F_B$ is the buoyant force, V is the volume of the encasement, $\rho$ is the fluid density and g is the gravitational acceleration. So, as the air or vacuum or any other fluid with comparable density is filled inside the encasement 1, the volume occupied by the encasements 1 increase which in turn increases the amount of buoyant force ($F_B$). The increase in the buoyant force enables the encasements 1 to float on the upper surface of water body 2.

The cavities of each of the encasements house plurality of 'basic units' that convert the hydrokinetic wave motion into electrical energy. Each of the encasements or 'modules' 1 is employed with multiple 'basic units' 6 that harnesses and convert the hydrokinetic energy of a water body 2 into electrical energy. The 'basic units' 6 are installed in the encasements in a face centered cubic (FCC) arrangement (two dimensional 2D), these 'basic units' are separated from each other by a defined distance in order to insulate each other from any magnetic interference for the adjacent unit.

The module 1 may have dimensions of 65×39 inches and is capable of employing approximately 1400 basic units. These basic units 1 in association with each other may generate a substantial amount of electrical energy and may have a power rating that is approximately 5 kilowatt (kW). All the modules 1 are capable of being cascaded in series or parallel in order to form an array which may generate required electrical energy for utility scale applications.

Figure 2:
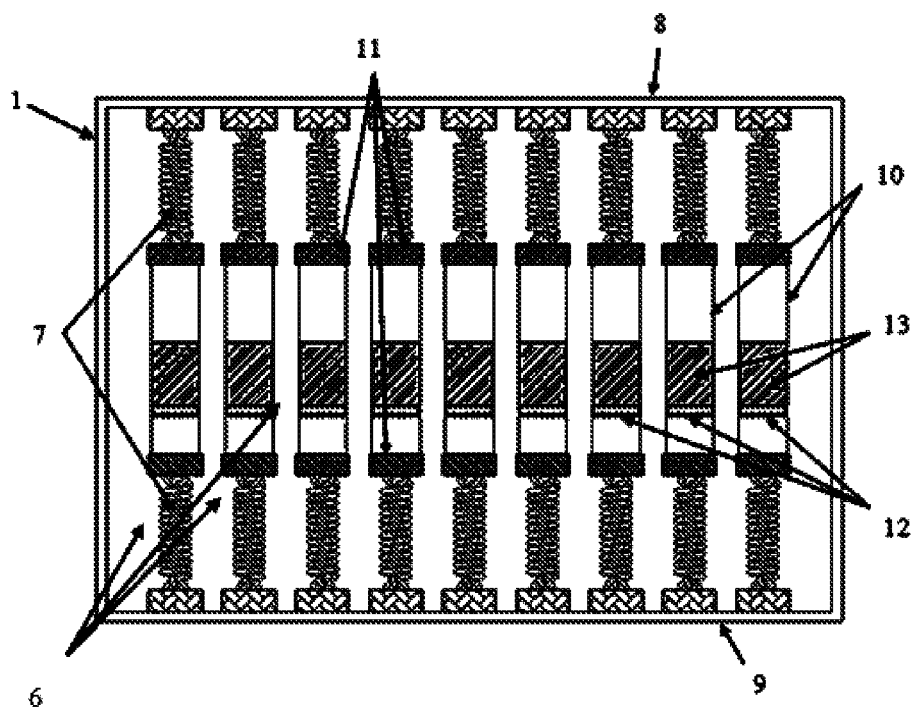
FIG. 2 illustrates a sectional side view of one of the encasements or 'modules' contained with the 'basic units' as explained in the exemplary embodiment of the aspects of the disclosed embodiments.
Figure 3:
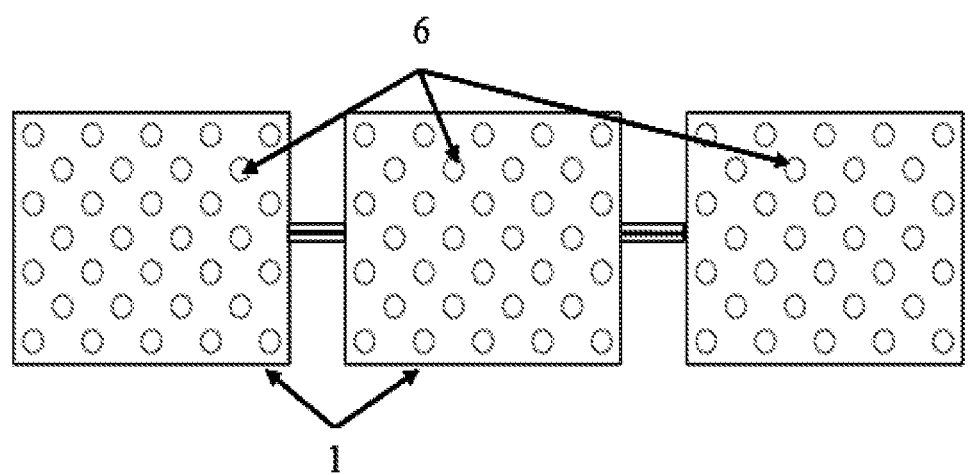
FIG. 3 illustrates a top sectional view of the encasements or 'modules' representing the placement of the 'basic units' within the encasements or 'modules'.
Figure 4:
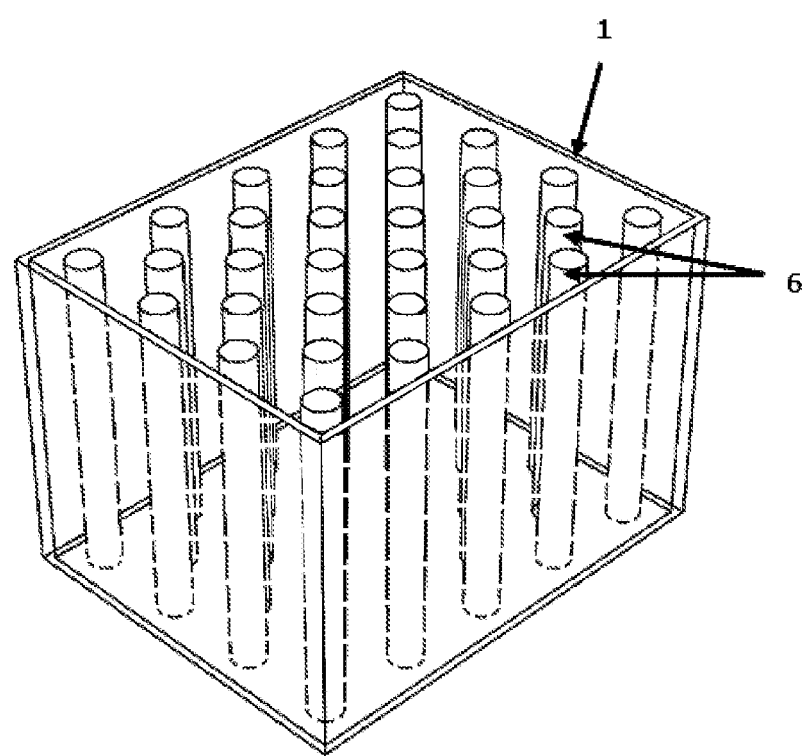
FIG. 4 illustrates a profile view of one of the encasements or the 'module' representing the placement of 'basic units' as per the exemplary embodiment of the aspects of the disclosed embodiments

Referring to FIG. 2, a sectional side view of the proposed device is illustrated, wherein each of the basic units 6 comprises various components that includes at least two springs 7, a cylindrical tube 10, ferromagnetic fluid, two fixed magnets 11, one movable magnet 12, an electric coil 13. The springs 7 are mounted in the modules 1, preferably in a vertical orientation and are affixed with the top 8 and bottom 9 portions of the modules 1. The springs 7 have a proximal and distal end, wherein the proximal end of a primary spring is connected to the top portion 8 and the distal end of the secondary spring is connected to the bottom portion 9 of the modules 1.

The engagement of springs 7 is in such a manner that the distal end of the primary spring and proximal end of the secondary spring are connected to the tube and facilitate amplification of oscillatory motion. As the modules 1 are floating on the surface of water body, the disturbances/hydrokinetic energy (i.e., waves, tides etc.) caused at the water surface 2 are transferred to the springs which in turn induces vibrations/jerks in the springs 7. These vibrations completely depend on the frequency of disturbances that are induced within the water body or in other words the amplitude of the wave 2. In between the distal end of the primary spring and proximal end of the secondary spring is the placement of the tube 10.

The cylindrical tube 10 is made up of glass or any other material with comparable properties especially the friction coefficient with respect to metals coated over magnets (in this embodiment but not limited to zinc or stainless steel) and is housed with a ferromagnetic fluid, two fixed magnets 11 and a movable magnet 12. The magnets are preferably formed of alloys of rare earth elements with a coating of zinc or stainless steel. The ferromagnetic fluid is a liquid substance that becomes strongly magnetized in the presence of strong magnetic field. Illustratively, the liquid is transformer oil-based liquid. The magnetism of the fluid increases with the increase in the nearby magnetic field. The ferromagnetic fluid forms multiple toroidal O-rings' on the exposed outer peripheral surfaces or edges of the magnets 11, 12, wherein the circular rings formed amplify the magnetic field of both the fixed 11 and movable magnet 12 and also reduces the friction between the magnet and cylindrical tube 10. The friction is so minimal that the movable magnet 12 almost floats within the tube and experiences almost negligible dampening effect due to sliding friction. The fixed magnets 11 are placed at the top and bottom portion of the cylindrical tube and the movable magnet 12 is placed in between both the fixed magnets 11.

Both the fixed magnets 11 and the movable magnet 12 are positioned in such a way that the south pole of the top fixed magnet faces the south pole of the movable magnet and similarly the north pole of the bottom fixed magnet faces the north pole of the movable magnet. Such arrangement is introduced in order to enable repulsive force in between the fixed magnets and movable magnet. The magnets that are employed within the cylindrical tube 10 are rare earth magnets having strong magnetic flux but any other magnetic material of comparable or higher magnetic flux can be substituted.

The movable magnet 12 therefore oscillates in between the fixed magnets 11 due to the vibrations induced by the springs as well as repulsion caused by the fixed magnets 11. All these arrangements force the movable magnet 12 to oscillate with maximum frequency. The outer surface of the cylindrical tube 10 is wrapped with an electric coil 13, wherein the relative motion of the movable magnet 12 and electric coil induces an electric current in the electric coil 13 in accordance with the law of electromagnetic induction.

The electric current is generated in the form of Alternating Current (AC) which can be converted into Direct Current (DC) for storage purposes. The system is therefore installed with a voltage processing unit that comprises an AC to DC converter and a charge controller. The AC to DC converter is a circuit implemented for converting the input of alternating current into direct current. In another embodiment an AC-to-AC converter may also be used.

The charge controller is connected with AC to DC converter that limits the rate at which the direct current is supplied further. The charge controller supplies the regulated direct current to a rechargeable battery or a capacitor or another form of energy storage device. More batteries can be employed based on the amount of electrical energy that is to be stored within the batteries.

Although the field of the invention has been described herein with limited reference to specific embodiments, this description is not meant to be construed in a limiting sense. Various modifications of the disclosed embodiments, as well as alternate embodiments of the invention, will become apparent to persons skilled in the art upon reference to the description of the invention.

I claim:

1. A hydrokinetic energy-based power generation system, comprising:
   i. a plurality of encasement modules (1), each of the plurality of modules having an encasement housing, the housing forming a cavity, wherein each cavity is filled with a gas and the plurality of modules (1) are moored to a streambed (3) of a water body (2) by one or more anchors (4), each of the plurality of modules configured to float on a surface of the water body;
   ii. a plurality of basic converter units (6) mounted inside each of the plurality of modules (1), each basic unit of the plurality of basic units being operable to convert a hydrokinetic energy of the water body (2) acting on each of the plurality of encasement modules into electrical energy, wherein each of the plurality of basic converter units (6) comprises:
      a. two springs (7) wherein the two springs (7) are subjected to the hydrokinetic energy of the water body, the hydrokinetic energy inducing oscillatory motion in the two springs (7);
      b. a cylindrical tube (10) housed in between the two springs (7) such that an endpoint of a first of the two springs connects a first end portion of the cylindrical tube to a first inner side of the encasement housing of one of the plurality of modules, and an endpoint of a second of the two springs connects a second end portion of the cylindrical tube to a second inner side of the encasement housing of the one of the plurality of modules, the second inner side being opposite the first inner side, such that the cylindrical tube is movable by oscillatory motion of the two springs, the cylindrical tube containing a ferromagnetic fluid;
      c. two fixed magnets (11) fixed within the tube and a movable magnet (12) within the tube, wherein the movable magnet (12) slides freely within the tube relative to the fixed magnets and relative to the tube upon movement of the cylindrical tube due to movement caused by both the motion of the two springs and by repulsive forces between the movable magnet and the two fixed magnets (11), wherein the ferromagnetic fluid forms a toroidal shaped ring within the tube (10) between an edge of the movable magnet (12) and an inner surface of the tube (10) to thereby reduce a sliding friction between the movable magnet and the tube; and
      d. an electric coil (13) connected wrapped around the tube (10);
         wherein relative motion of the movable magnet (12) and the electric coil induces an electric current in the electric coil (13); and
         wherein in each encasement module, every basic converter unit located therein is connected to the encasement housing only by the two springs (7); and
      iii. a voltage processing unit connected to each of the basic units or to each of the plurality of modules, or to both for converting the electric currents of the basic converter units (6) from alternating current to direct current.

2. The system as claimed in claim 1, wherein the voltage processing unit comprises an alternating current to direct current converter or an alternating current to alternating current converter and a charge controller.

3. The system as claimed in claim 1, wherein said ferromagnetic fluid comprises transformer oil.

4. The system as claimed in claim 1, wherein the two fixed magnets and the movable magnet are each formed of alloys of rare earth elements with a coating of zinc or stainless steel.

5. The system as claimed in claim 1, wherein the plurality of basic units within each respective encasement module are separated from each other by a defined distance sufficient to limit magnetic interference from adjacent basic unit(s) within the respective encasement module.

* * * * *